(12) United States Patent
Couch, III (10) Patent No.: US 10,364,935 B2
(45) Date of Patent: Jul. 30, 2019

(54) PHOTOGRAPHIC MOUNT

(71) Applicant: LumiQuest Ventures LLC, New Braunfels, TX (US)

(72) Inventor: Quest C. Couch, III, New Braunfels, TX (US)

(73) Assignee: LUMIQUEST VENTURES LLC, New Braunfels, TX (US)

( * ) Notice: Subject to any disclaimer, the term of this patent is extended or adjusted under 35 U.S.C. 154(b) by 0 days.

(21) Appl. No.: 15/903,927

(22) Filed: Feb. 23, 2018

(65) Prior Publication Data

US 2019/0120423 A1 Apr. 25, 2019

Related U.S. Application Data (63) Continuation-in-part of application No. 29/623,514, filed on Oct. 25, 2017.

(51) Int. Cl.
| | |
|---|---|
| *F16M 11/18* | (2006.01) |
| *F16M 13/02* | (2006.01) |
| *F16M 11/04* | (2006.01) |
| *G03B 17/56* | (2006.01) |
| *F16M 11/06* | (2006.01) |
| *A45B 11/00* | (2006.01) |

(52) U.S. Cl.
CPC .......... *F16M 13/02* (2013.01); *F16M 11/041* (2013.01); *F16M 11/06* (2013.01); *F16M 11/18* (2013.01); *G03B 17/561* (2013.01); *G03B 17/566* (2013.01); *A45B 11/00* (2013.01); *F16M 2200/024* (2013.01)

(58) Field of Classification Search
CPC .... F16M 13/02; F16M 11/041; F16M 11/043; F16M 11/06; F16M 11/186; F16M 11/18; F16M 11/20; F16M 11/42; F16M 11/14; F16M 2200/024; G03B 17/561; G03B 17/563; G03B 17/565; G03B 17/566; G03B 17/58; G03B 15/06; G03B 15/08; G03B 15/16; A45B 11/00
USPC ......... 248/177.1, 178.1, 179.1, 181.1, 180.1, 248/187.1, 176.3, 176.1, 230.1; 396/422, 396/158, 177; 362/3, 396
See application file for complete search history.

(56) References Cited

U.S. PATENT DOCUMENTS

| | | | | |
|---|---|---|---|---|
| 3,356,325 | A * | 12/1967 | Schnase | F16M 11/041 248/187.1 |
| 3,589,260 | A * | 6/1971 | Ferra | G03B 17/561 248/177.1 |
| 3,731,897 | A * | 5/1973 | Price | F16M 13/02 248/229.1 |
| 4,057,816 | A | 11/1977 | Killian, Jr. et al. | |

(Continued)

OTHER PUBLICATIONS

Camera Flash Adapter, photographs taken Sep. 22, 2017 (2 pages).
(Continued)

*Primary Examiner* — Nkeisha Smith
(74) *Attorney, Agent, or Firm* — Pizarro Allen PC (57) ABSTRACT

A photographic mount may include an adapter and a receiving plate having a recess configured for receiving the adapter. The adapter may have a connector configured for attaching a camera and a recess configured for receiving a fitting of a flash unit. The receiving plate may have a receptacle configured for receiving a shaft of a photographic accessory such as an umbrella.

13 Claims, 6 Drawing Sheets

(56) References Cited

U.S. PATENT DOCUMENTS

| | | | | |
|---|---|---|---|---|
| 4,187,021 A * | 2/1980 | Balser | ................... | G03B 15/03 352/243 |
| 4,210,952 A * | 7/1980 | Ressmeyer | ............ | G03B 15/03 362/106 |
| D270,915 S | 10/1983 | Fohl | | |
| 4,443,837 A * | 4/1984 | Migliori | ............... | F16M 11/043 362/16 |
| 4,525,052 A | 6/1985 | Kosugi et al. | | |
| 4,570,887 A * | 2/1986 | Banister | ............... | F16M 11/041 248/187.1 |
| D287,122 S | 12/1986 | Hollister | | |
| 4,752,794 A * | 6/1988 | Bohannon | .......... | F16M 11/2028 362/11 |
| 4,929,973 A * | 5/1990 | Nakatani | .............. | F16M 11/041 248/177.1 |
| 5,119,203 A * | 6/1992 | Hosaka | ................ | H04N 5/2251 248/179.1 |
| 6,042,277 A * | 3/2000 | Errington | ................ | G03B 15/05 248/187.1 |
| 6,196,504 B1 * | 3/2001 | Lemke | ................ | F16M 11/041 248/187.1 |
| 6,712,322 B2 * | 3/2004 | Nakatani | .............. | F16M 11/105 248/177.1 |
| 6,827,319 B2 * | 12/2004 | Mayr | ................... | F16M 11/041 248/187.1 |
| 6,979,137 B1 * | 12/2005 | Saliaris | ................ | G03B 17/561 396/422 |
| 6,988,846 B2 * | 1/2006 | Vogt | ......................... | G02B 7/00 248/177.1 |
| 7,025,313 B2 * | 4/2006 | Ma | ........................ | F16M 11/10 248/177.1 |
| 7,549,807 B2 * | 6/2009 | Nazarian | .............. | F16M 11/105 348/373 |
| 7,668,458 B2 * | 2/2010 | Knightlinger | .......... | F16M 11/14 135/16 |
| 7,959,120 B2 * | 6/2011 | Liao | .................... | B60R 11/0252 248/122.1 |
| 8,256,726 B2 * | 9/2012 | Bordignon | ............... | F16M 1/04 248/177.1 |
| 8,282,055 B2 * | 10/2012 | Burklin | ................. | F16C 11/106 248/124.2 |
| 8,398,315 B2 | 3/2013 | Johnson | | |
| 8,794,575 B2 | 8/2014 | Vogt | | |
| 8,827,219 B2 | 9/2014 | Kessler et al. | | |
| D717,361 S | 11/2014 | Nikaido | | |
| D764,565 S | 8/2016 | Tekunoff et al. | | |
| D770,556 S | 11/2016 | Sharma et al. | | |
| D773,551 S | 12/2016 | Clearman et al. | | |
| D798,370 S | 9/2017 | Nakajima et al. | | |
| D798,940 S | 10/2017 | Costa et al. | | |
| 2003/0218108 A1 * | 11/2003 | Werner | ................ | F16M 11/041 248/187.1 |
| 2009/0101772 A1 * | 4/2009 | Bevirt | .................... | F16M 11/40 248/180.1 |
| 2012/0106946 A1 | 5/2012 | Johnson | | |
| 2015/0028171 A1 * | 1/2015 | Guidolin | ............. | F16M 11/043 248/178.1 |
| 2016/0004141 A1 * | 1/2016 | Terashita | ............. | F16M 11/041 362/3 |

OTHER PUBLICATIONS

Really Right Stuff FA-CS3 Cold Shoe for RRS and Arca-Type Clamps, https://www.bhphotovideo.com/c/product/1350391-REG/really_right_stuff_fa_cs3_insulated_cold_shoe_for.html, accessed Sep. 25, 2017 (7 pages).

Joby Universal Flash Shoe, https://www.bhphotovideo.com/c/product/1032336-REG/joby_jb01311_universal_flash_shoe.html, accessed Oct. 24, 2017 (6 pages).

Nisha Hot Shoe/Tripod Mount, https://www.bhphotovideo.com/c/product/764588-REG/Nisha_HTS_T_Hot_Shoe_Tripod_Mount.html?sts=pi, accessed Oct. 24, 2017 (3 pages).

* cited by examiner

PHOTOGRAPHIC MOUNT

CROSS-REFERENCE TO RELATED APPLICATIONS

This application is a continuation-in-part of U.S. Design patent application No. 29/623,514 filed Oct. 25, 2017, the disclosure of which is wholly incorporated by reference herein.

COPYRIGHT NOTICE

This application contains material that is subject to copyright protection. Such material may be reproduced exactly as it appears in Patent and Trademark Office patent files or records. The copyright owner otherwise reserves all rights to such material.

FIELD

The present disclosure relates to mounts for attaching photographic cameras, flashes, umbrellas, and other devices to a stand or other stabilizing structure.

BACKGROUND

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

In the field of photography, a photographer may often position either a camera or a flash unit on a tripod or other mounting device. It is desirable to be able to quickly switch between the camera and the flash unit. However, existing solutions have proven to be too cumbersome, complicated, or expensive. It would be a significant advancement in the art to provide a device suitable for mounting either a camera or a flash unit to a tripod or other mounting device that is simple, quick, and easy to operate and inexpensive to manufacture and maintain.

SUMMARY

In some embodiments, a photographic mount may include an adapter having a top plate, a male connector depending upward from the top plate and configured for attachment to a female connector of a camera, a receptacle in the top plate configured for receiving a fitting of a flash unit, and a first plurality of walls depending downward from the top plate. The mount may also include a receiving plate having a first recess therein configured for receiving at least a portion of one or more of the first plurality of walls, a second recess therein configured for receiving a shaft of an umbrella, and a fastener configured for holding the shaft in a fixed position with respect to the receiving plate.

In some embodiments, an adapter may be configured for alternately attaching either a camera or a flash unit. The adapter may include a top plate having a male threaded connector configured for mating with a female threaded receptacle of a camera, and a flash receptacle configured for receiving a fitting of a flash unit, and a plurality of walls depending from the top plate and being configured for insertion into a recess of a receiving plate.

In some embodiments, a receiving plate may include a generally flat plate having a first recess therein configured for receiving an adapter and a second recess therein configured for receiving a shaft of a lighting accessory; and a fastener configured for holding the shaft in a fixed position with respect to the receiving plate.

In some embodiments, an adapter may be configured for alternately attaching either a camera or a flash unit to a stand or stabilizer. The adapter may include a connector configured for attachment of a camera and a slot configured for attachment of a flash unit.

Other features and advantages of the present disclosure will become apparent from the following detailed description, taken in conjunction with the accompanying drawings, which illustrate, by way of example, the principles of some exemplary and non-limiting embodiments of the invention.

DETAILED DESCRIPTION

In some embodiments, photographic mounts described herein may facilitate attachment and detachment of one or more of a camera, flash unit, photographic umbrella, and/or other photographic accessory to a stand (such as a tripod), hand-held mount, or other stabilizer. Photographic mounts as described herein may include an adapter, a receiving plate, or both. In some embodiments, photography systems described herein may further include one or more of a camera, stand, stabilizer, reflector or diffuser (such as an umbrella-type reflector or diffuser or convertible variant thereof), other photographic accessory, and any combination thereof.

A stand as described herein may include a support frame. A stand may, for example, include a frame configurable for reproducible mounting of a photographic device, e.g., a camera or flash unit connected to a photographic mount, at a desired position and/or orientation relative to a base, such as a ground or platform. In some embodiments, stands described herein may be adjustable with respect to one or more axes, such as one or more vertical and/or horizontal axes. Stands may, for example, include a three-legged frame as may commonly be referred to as a tripod stand or tripod. In some embodiments, a photographic mount may be configured for attachment to a stabilizer. A stabilizer may be configured to be manually held by a person. For example, a stabilizer may be sized and/or shaped, such as with a grip, to be manually graspable by a user.

In some embodiments, a stand or stabilizer may include one or more connectors suitable for attaching a camera or flash unit. For example, a stand or stabilizer may include a threaded stud configured for attachment to a corresponding female threaded receptacle included on a camera or flash unit. In some embodiments, adapters described herein may include a similar female connection. Accordingly, such adapters may be directly attached to a stand or stabilizer.

In some embodiments, adapters described herein may be configured for attachment to a receiving plate, which itself may be reversibly attachable and detachable from a stand or other stabilizing element. For example, adapters described herein may be configured for mounting to a quick-connect receiving plate or to other types of receiving plates. In some embodiments, a receiving plate may be specifically configured for use with adapters as described herein.

In some embodiments, a receiving plate may be a quick-release plate. A quick-release plate may, for example, allow a person to readily attach and detach a camera, flash, or other photographic device to a stand or stabilizer without requiring the person to screw the photographic device to the stand or stabilizer. For example, a quick-release plate may receive a camera or flash unit via an adapter as described herein. In some embodiments, a quick-release plate may be configured with a ratchet-style locking and release lever or other suitable mechanism to facilitate quick capture and release of an adapter as described herein. For example, some quick-release plates may require an operator to press both sides of a release knob or latch and turn the knob or latch to release an attached photographic device or adapter. Thus, some quick-release plates may be configured for convenient release of a photographic device or adapter but also prevent an operator from accidently releasing the photographic device or adapter.

In some embodiments, a photographic mount may include an adapter, a receiving plate, or both. In some embodiments, photographic systems described herein may further include one or more of a camera, flash unit, stand (such as a tripod or other stabilizer), umbrella, other photographic accessory, and any combinations thereof.

In some embodiments, a photographic mount may include a receiving plate including a receptacle, wherein the receptacle may be suitably configured to receive a shaft of a lighting accessory, such as an umbrella-type photographic reflector or diffuser (e.g., "shoot-thru" diffuser) or a convertible variant thereof (e.g., convertible between reflector and diffuser), for example. A receptacle may be configured such that a shaft may extend at an angle from the receiving plate. For example, the angle at which the shaft is mounted to the receiving plate may be selected so that a flash unit mounted to the receiving plate via an adapter as described herein may be oriented at a suitable angle such that light originating from the flash unit may be appropriately directed to the reflective surface of the umbrella, e.g., toward a central portion or other desired portion of the umbrella.

In some embodiments, a common adapter may be configured for reversible mounting of either a camera or a flash unit without requiring unscrewing of the camera or flash unit from a stand or other stabilizer. For example, one adapter as described herein may be attached to a camera, and another adapter as described herein may be attached to a flash unit.

As so configured, the camera and the flash unit may readily be alternately installed on a receiving plate as described herein via the respective adapters.

Referring to FIGS. 1-8, in some embodiments an adapter 10 may include a top plate 12, a connector 14, a receptacle 16, one or more sidewalls 18, and a recess 20. Connector 14 may extend from the top plate 12 and may be a threaded stud, for example. More generally, connector 14 may be of any suitable type for attachment of a camera or other photographic device. By way of example and not limitation, connector 14 may be a quarter-inch, 20-thread-count stud configured for mating with a similarly threaded female receptacle on a bottom surface of a camera. Of course, other forms of connector 14, such as plugs, pins, or prongs, for example, may be alternatively used. For example, a type of connector 14 may depend on a corresponding type of a complementary connection for a camera to which the adapter 10 is configured to attach.

In some embodiments, receptacle 16 may be a slotted receptacle. Receptacle 16 may be configured, e.g., sized and shaped, to receive a flange, protrusion, or other fitting of a flash unit. Ledges 17, 19 may extend inward from a rim 22 of top plate 12 and may help to define the shape of receptacle 16 and provide support to a corresponding fitting of a flash unit. In some embodiments, adapter 10 may include a recess 20. A flash unit may include a retractable pin designed to seat within the recess 20 when the flash unit is attached to the adapter 10.

In some embodiments, the one or more sidewalls 18 may be beveled. A beveled sidewall 18 may be configured to engage with a corresponding beveled wall 38 of a receiving plate 30 (see FIG. 10) when an adapter 10 is correctly attached to the receiving plate 30. For example, a beveled sidewall 18 may be angled so that the sidewall 18 is wedged together with a corresponding wall 38 of the receiving plate 30. Thus, the complementary shapes and sizes of a sidewall 18 of an adapter 10 and a corresponding wall 38 of a receiving plate 30 may help to secure the adapter 10 to the receiving plate 30. In some embodiments, an adapter 10 may include a plurality of sidewalls 18, and when one or more sidewalls among the plurality of sidewalls are oriented properly with one or more corresponding walls 38 of a receiving plate 30, the adapter 10 and receiving plate 30 may mate together. Thus, in some embodiments, the relative shape and size of the one or more sidewalls 18 of an adapter 10 and one or more corresponding walls 38 of a receiving plate 30 may help a user to automatically orient the adapter 10 and receiving plate 30 in a proper orientation with respect to each other. In some embodiments, sidewalls 18 and corresponding walls 38 may be configured so that adapter 10 may fit onto receiving plate 30 in only one orientation. In other embodiments, sidewalls 18 and corresponding walls 38 may be configured so that adapter 10 may fit onto receiving plate 30 in more than one orientation. Of course, in some embodiments, sidewalls 18 and 38 may not be beveled. Although the exemplary embodiment of adapter 10 shown in FIGS. 1-8 has a substantially octagonal arrangement of sidewalls 18, persons of ordinary skill in the art will understand that the arrangement of sidewalls 18 may be configured in any suitable shape, such as square, rectangular, hexagonal, other polygon, circular, oval, elliptical, or irregular, for example. And the arrangement of corresponding walls 38 of receiving plate 30 may or may not be the same as sidewalls 18. For example, in some embodiments, all or fewer than all of the sidewalls 18 may be engaged with a corresponding wall 38, and all or fewer than all of the corresponding walls 38 may be engaged with a sidewall 18.

Figure 1:
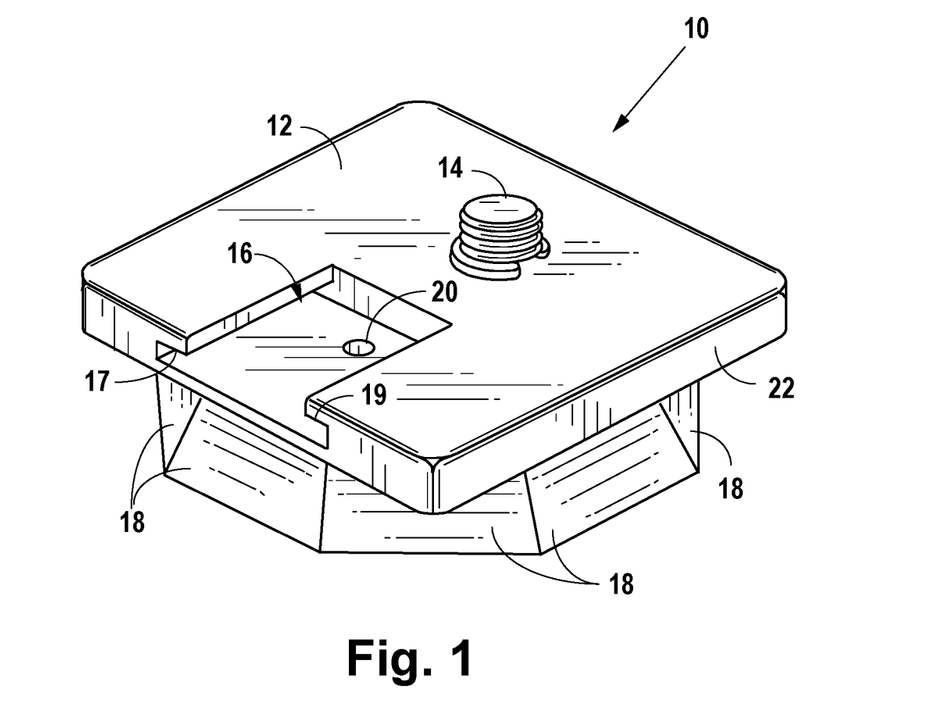
FIG. 1 is a top perspective view of an embodiment of a flash and camera adapter.
Figure 2:
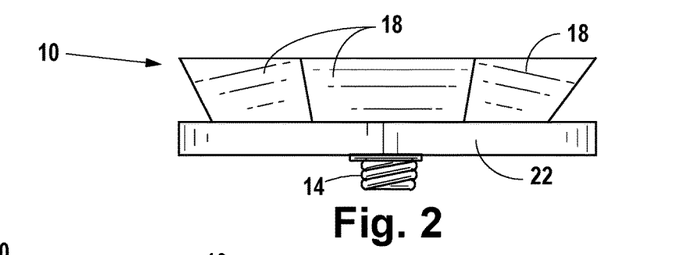
FIG. 2 is a rear elevational view of the flash and camera adapter of FIG. 1.
Figure 3:
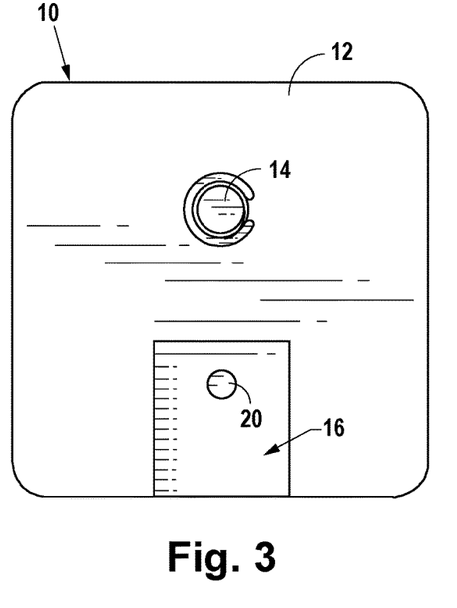
FIG. 3 is a top plan view of the flash and camera adapter of FIG. 1.
Figure 4:
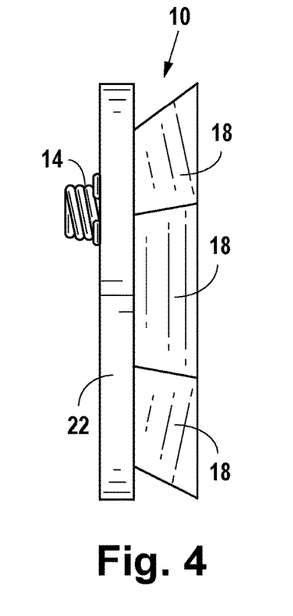
FIG. 4 is a right side elevational view of the flash and camera adapter of FIG. 1.
Figure 5:
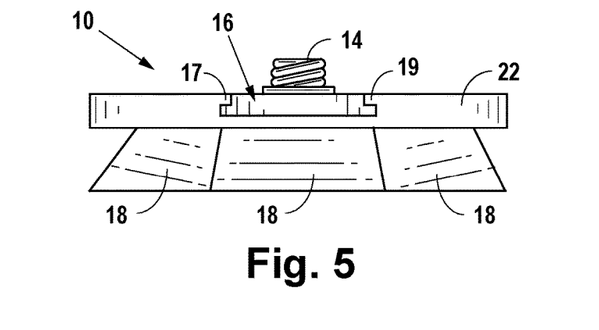
FIG. 5 is a front elevational view of the flash and camera adapter of FIG. 1.
Figure 6:
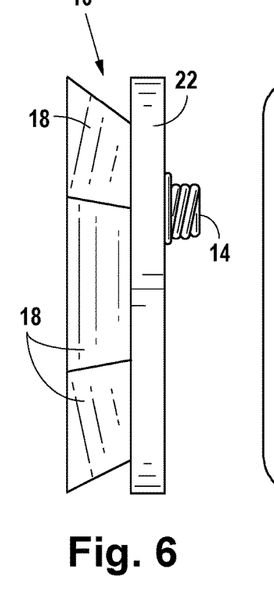
FIG. 6 is a left side elevational view of the flash and camera adapter of FIG. 1.
Figure 7:
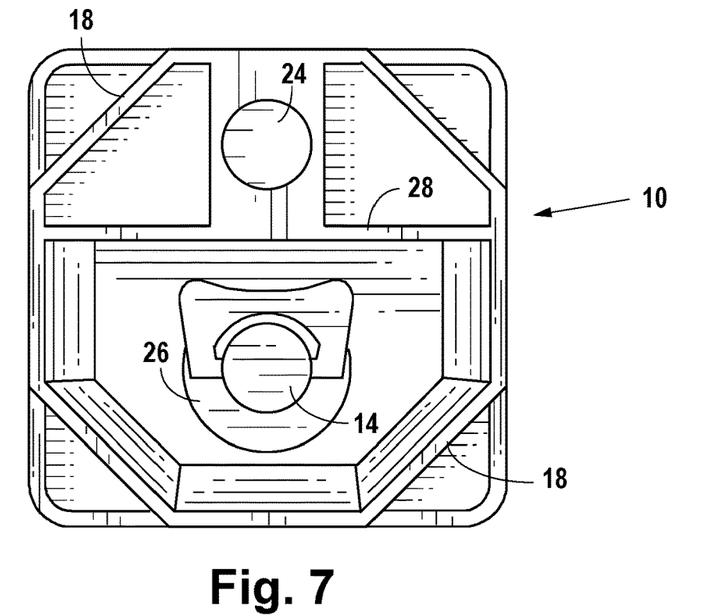
FIG. 7 is a bottom plan view of the flash and camera adapter of FIG. 1.
Figure 8:
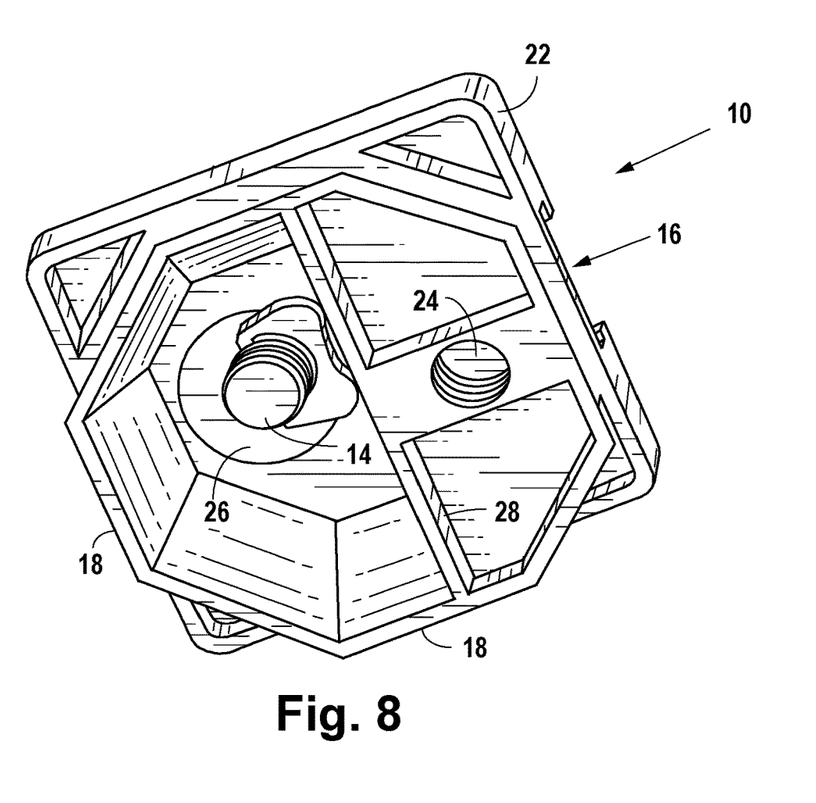
FIG. 8 is a bottom perspective view of the flash and camera adapter of FIG. 1.

Referring to FIGS. 7 and 8, in some embodiments connector 14 may be rotationally secured to adapter 10, such as using a threaded fastener (e.g., a nut) and one or more washers. In some embodiments, connector 14 may be secured to adapter 10 using a rotatable D-ring 26. In some embodiments, adapter 10 may include one or more brackets 28. In some embodiments, an adapter 10 may include a backside connector 24. Backside connector 24 may, for example, be configured with threads to receive a threaded connection from a stand or stabilizer. Thus, in some embodiments, an adapter 10 may be directly mounted on a stand or stabilizer.

Figure 9:
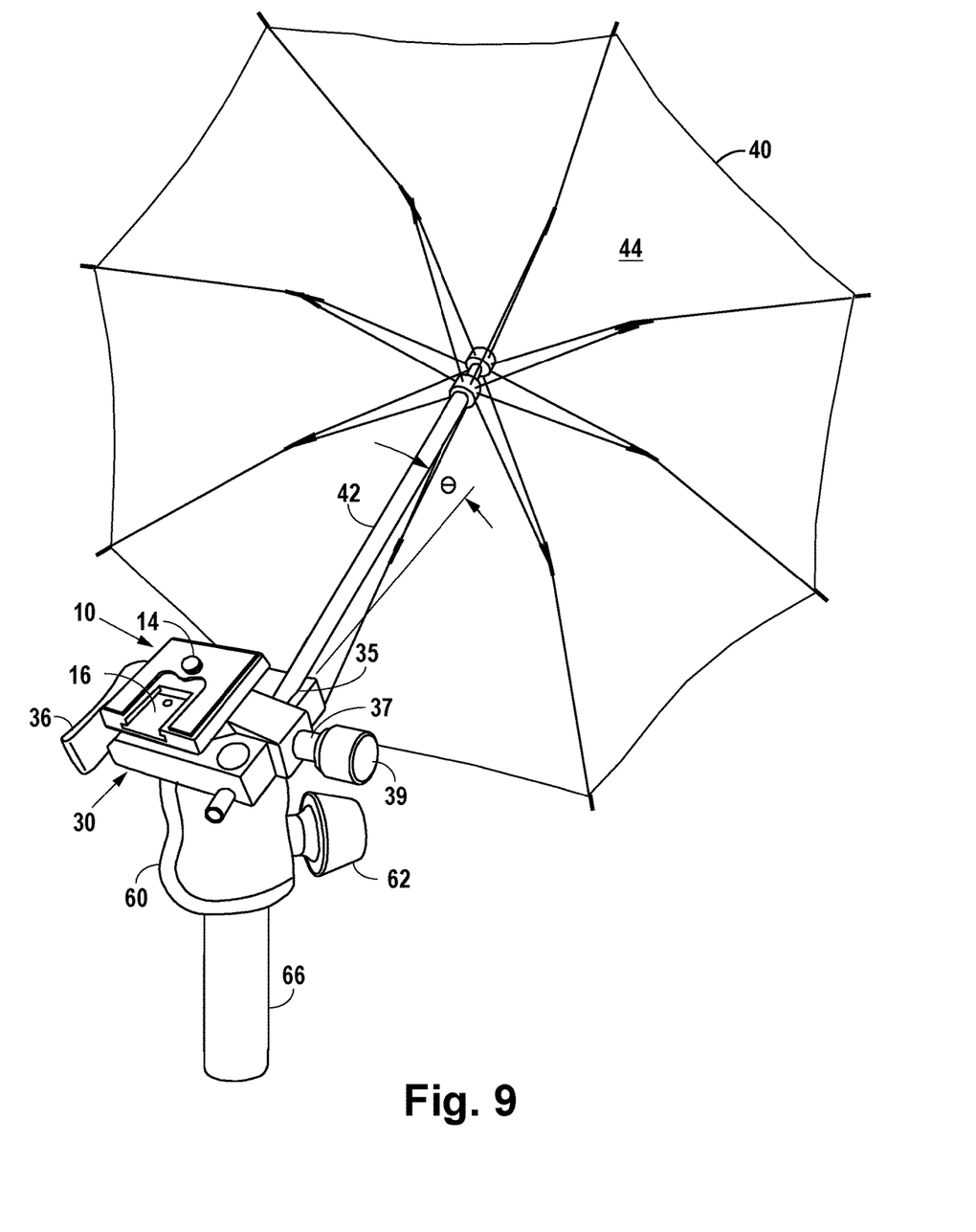
FIG. 9 is a perspective view of a flash and camera adapter mounted to a receiving plate of a quick-connect assembly having an umbrella shaft mounted therein.
Figure 10:
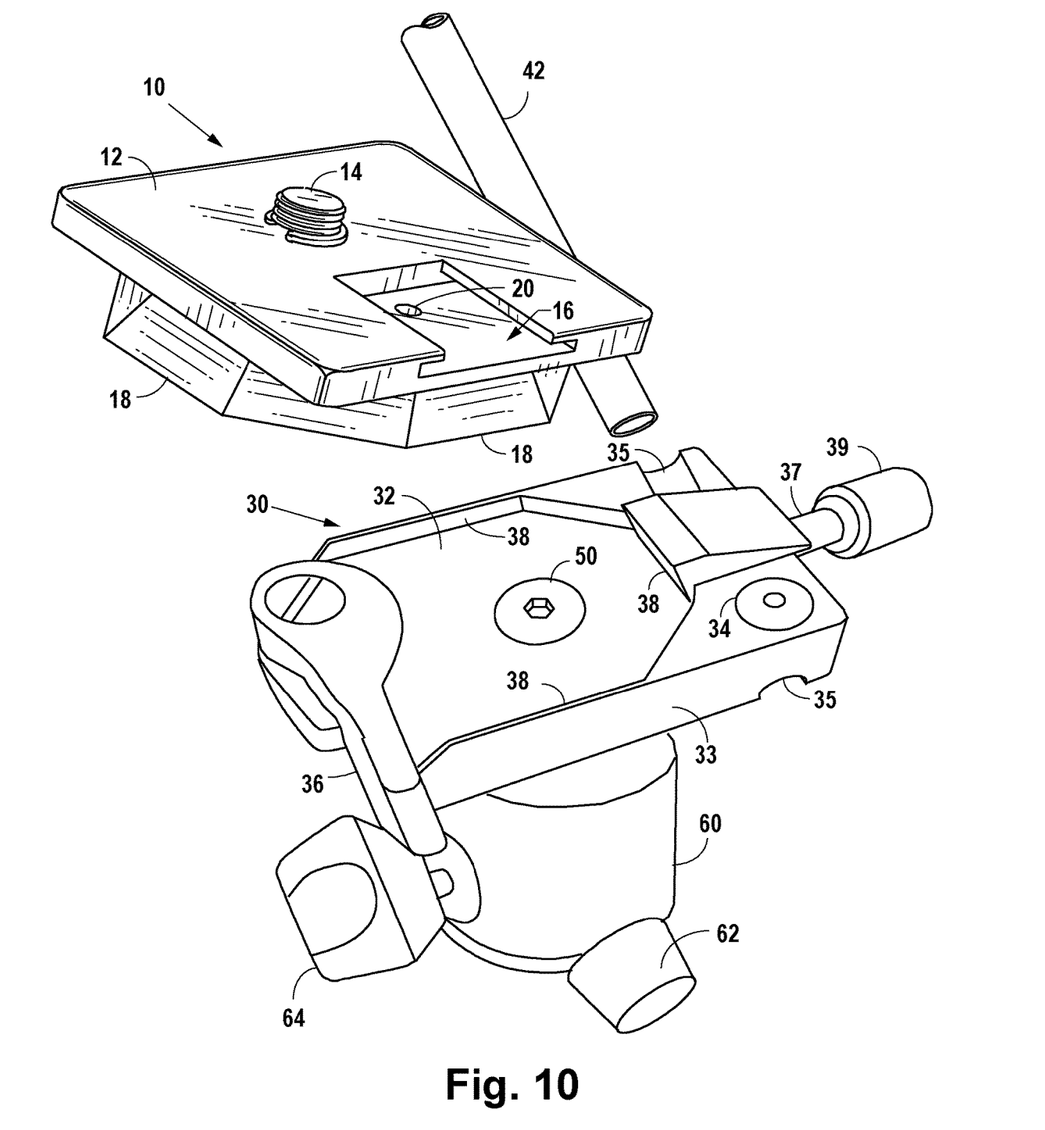
FIG. 10 is an exploded perspective view of the adapter, quick-connect assembly, and umbrella shaft of FIG. 9.
Figure 11:
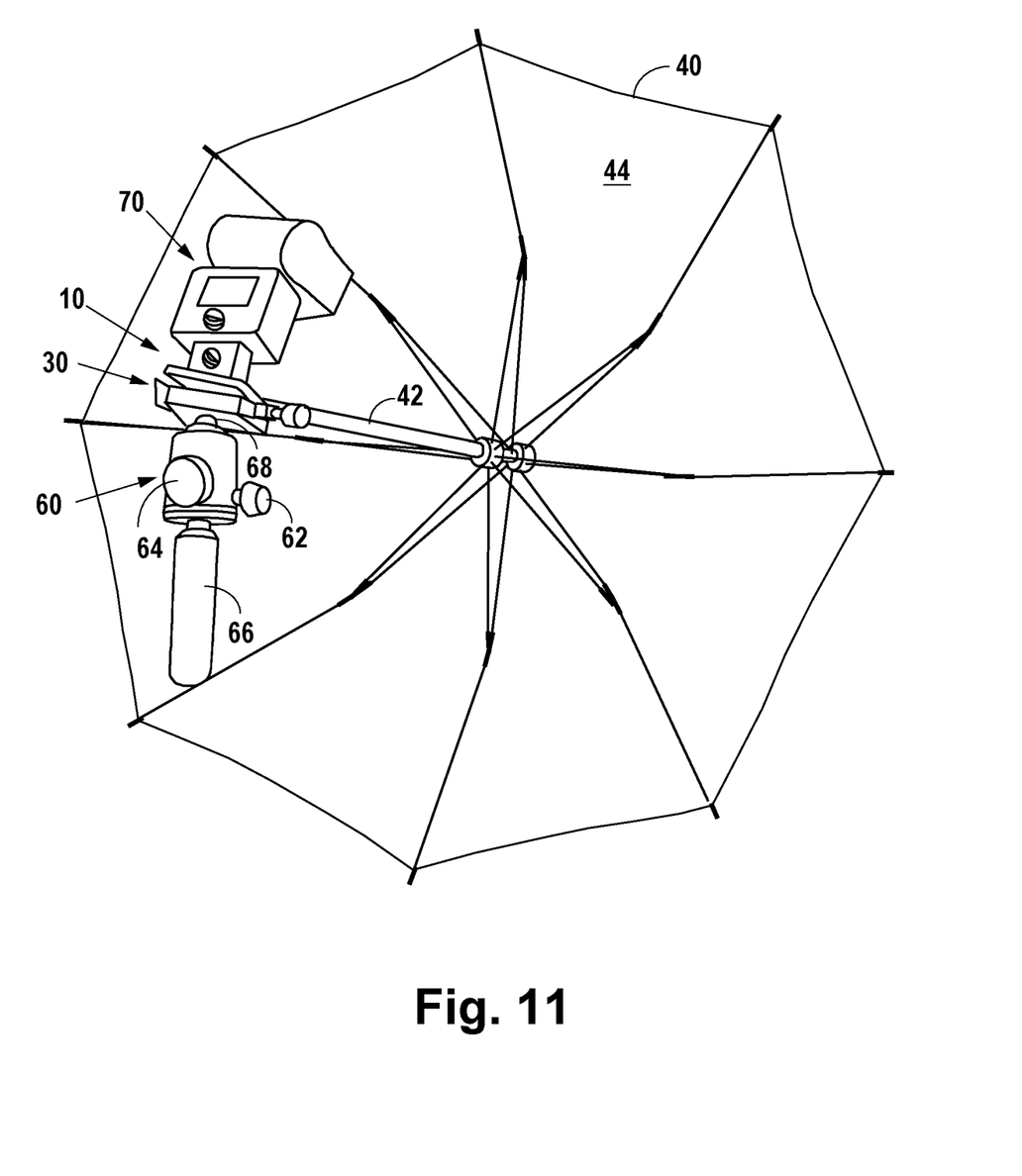
FIG. 11 is another perspective view of the adapter, quick-connect assembly, and umbrella shaft of FIG. 9 further showing an umbrella and a hand-held grip.

Referring to FIGS. 9-11, in some embodiments an adapter 10 may be mounted to a receiving plate 30. Receiving plate 30 may include a recess 32 generally formed by walls 38 and defining a space in which an adapter 10 may be positioned when attached to the receiving plate 30. Receiving plate 30 may further include a sidewall 33 and a bubble level 34 configured for indicating an orientation of receiving plate 30 with respect to the horizontal. In some embodiments, receiving plate 30 may be a quick-connect plate including one or more lever arms 36. Lever arm 36 may be configured to provide for reversible attachment and detachment of adapter 10 on receiving plate 30. For example, lever arm 36 may be part of a ratchet-style locking and unlocking mechanism or other suitable mechanism for holding an adapter 10 in recess 32 of receiving plate 30 and releasing adapter 10 from recess 32.

In some embodiments, receiving plate 30 may include a receptacle 35 configured to receive a shaft (e.g., a rod or tube) 42 of an umbrella 40 or other suitable lighting accessory. For example, shaft 42 may be inserted into the receptacle 35 and held in place using a set screw 37 having a knob 39. In some embodiments, receptacle 35 may be configured to hold shaft 42 at an angle Θ with respect to receiving plate 30 such that shaft 42 is not parallel to receiving plate 30. Thus, receptacle 35 may be a truncated cylindrical recess having an axis oriented at an acute angle with respect to the generally flat receiving plate 30. The angle Θ (which may be an acute angle, e.g., about 15 degrees, or other suitable angle) may be suitable for use with an umbrella 40, e.g., an umbrella including a shaft 42 of a certain length, so that a flash unit 70 (see FIG. 11) mounted to an adapter 10 as described herein may automatically be oriented at a suitable angle such that light emanating from the flash unit 70 may be appropriately directed to a desired portion of a reflective surface 44 of umbrella 40 (e.g., a central portion or other portion thereof). Receiving plate 30 may also include a connector 50 configured for attaching receiving plate 30 to a stabilizer 60, such as an adjustable mount having a ball joint 68 and one or more position adjustment knobs 62, 64, for example, which may allow a user to position receiving plate 30 and hence the camera, flash, or other equipment attached thereto in a variety of positions.

As shown in FIG. 11, a photographic mount may include an adapter 10 mounted to a receiving plate 30 as described above. A flash unit 70 may be attached to the adapter 10 as also described above. A first end of shaft 42 may be attached to the receiving plate 30, and a second end of shaft 42 may be attached to an umbrella 40 having a reflective surface 44. The receiving plate 30 of the photographic mount may further be attached to a stabilizer 60. For example, stabilizer 60 may have a handle 66 configured for manual grasping by a user. Of course, the receiving plate 30 of the photographic mount may be attached to a tripod or other mounting structure in lieu of stabilizer 60.

Persons of ordinary skill in the art will appreciate that a photographic mount having a receiving plate 30 and adapter 10 as described herein may be very useful to a photographer. For example, a user may quickly and easily install a flash unit 70 onto an adapter 10 by inserting a fitting of the flash unit 70 into slot 16 of adapter 10, and the user may quickly and easily install adapter 10 onto receiving plate 30 by placing one or more sidewalls 18 of adapter 10 into engagement with one or more corresponding walls 38 of receiving plate 30. Installation and retention of adapter 10 onto receiving plate 30 may be facilitated by operation of lever arm 36 in a quick-connect fashion. Additionally, the user may quickly and easily install an umbrella 40 onto receiving plate 30 by inserting shaft 42 into recess 35 and tightening set screw 37 via knob 39 to hold shaft 42 in place, and the user may quickly and easily attach receiving plate 30 to stabilizer 60 via connector 50. As so configured, the photographic mount may be used to direct light from flash unit 70 onto reflective surface 44 of umbrella 40 to provide the desired lighting for taking photographs. Likewise, the photographic mount may be quickly and easily disassembled by reversing the foregoing steps.

Persons of ordinary skill in the art will also appreciate that a photographic mount having a receiving plate 30 and adapter 10 as described herein may also be very useful for mounting a camera. That is, connector 14 of adapter 10 may be screwed into a threaded female receptacle of a camera, and adapter 10 may be connected to receiving plate 30, which in turn may be connected to a stabilizer 60 or tripod or other mount as described above. Thus, adapter 10 and receiving plate 30 may be advantageously used to mount either a camera or a flash unit and an umbrella or other photographic accessory.

The embodiments described herein are some examples of the current invention. Various modifications and changes to the current invention will be apparent to persons of ordinary skill in the art. Among other things, any feature described for one embodiment may be used in any other embodiment. The scope of the invention is defined by the attached claims and other claims that may be drawn to this invention, considering the doctrine of equivalents, and is not limited to the specific examples described herein.

What is claimed is:

1. A photographic mount comprising:
   an adapter comprising
     a top plate,
     a male connector depending upward from said top plate and configured for attachment to a female connector of a camera,
     a receptacle in said top plate configured for receiving a fitting of a flash unit, and
     a first plurality of walls depending downward from said top plate; and
   a receiving plate comprising
     a first recess therein configured for receiving at least a portion of one or more of said first plurality of walls,
     a second recess therein configured for receiving a shaft of an umbrella, and
     a fastener configured for holding said shaft in a fixed position with respect to said receiving plate.

2. The photographic mount of claim 1 wherein said second recess is configured to hold the shaft at an angle with respect to said receiving plate.

3. The photographic mount of claim 1 wherein said first plurality of walls is configured in a substantially octagonal arrangement.

4. The photographic mount of claim 1 wherein one or more of said first plurality of walls are beveled.

5. The photographic mount of claim 1 wherein said first recess comprises a second plurality of walls configured for engagement with one or more of said first plurality of walls.

6. The photographic mount of claim 5 wherein said first plurality of walls and said second plurality of walls are beveled.

7. The photographic mount of claim 1 wherein said receiving plate comprises a quick-connect plate.

8. The photographic mount of claim 7 wherein said quick-connect plate comprises a lever arm configured to provide for reversible attachment and detachment of said adapter with respect to said receiving plate.

9. The photographic mount of claim 1 wherein said first plurality of walls and said first recess are configured such that said adapter may fit onto said receiving plate in only one orientation.

10. The photographic mount of claim 1 wherein said first plurality of walls and said first recess are configured such that said adapter may fit onto said receiving plate in more than one orientation.

11. An adapter configured for alternately attaching either a camera or a flash unit, the adapter comprising:
    a top plate comprising a male threaded connector configured for mating with a female threaded receptacle of a camera, and a flash receptacle configured for receiving a fitting of a flash unit; and
    a plurality of walls depending from said top plate and being configured for insertion into a recess of a receiving plate;
    wherein said flash receptacle comprises a slotted receptacle that extends inward from a rim of said top plate and downward from an upper surface of said top plate;
    wherein said slotted receptacle is partially defined by a pair of opposing ledges extending inward from said rim.

12. The adapter of claim 11 wherein said plurality of walls is configured in a substantially octagonal arrangement.

13. The adapter of claim 11 further comprising an underside and a threaded receptacle therein configured to receive a threaded male connector.

* * * * *